US 7,426,525 B2

(12) United States Patent
Sayers et al.

(10) Patent No.: US 7,426,525 B2
(45) Date of Patent: Sep. 16, 2008

(54) METHOD AND APPARATUS FOR IDENTIFYING AN OBJECT USING AN OBJECT DESCRIPTION LANGUAGE

(75) Inventors: Craig P. Sayers, Menlo Park, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 838 days.

(21) Appl. No.: 10/637,308

(22) Filed: Aug. 8, 2003

(65) Prior Publication Data
US 2005/0033768 A1 Feb. 10, 2005

(51) Int. Cl.
*G06F 17/30* (2006.01)
(52) U.S. Cl. ............... 707/104.1; 707/100; 707/103 R; 707/3
(58) Field of Classification Search ............... 707/101, 707/104.1, 203, 102, 100, 104
See application file for complete search history.

(56) References Cited

U.S. PATENT DOCUMENTS 5,873,093 A * 2/1999 Williamson et al. ..... 707/103 R
6,135,646 A * 10/2000 Kahn et al. ................. 709/217
6,154,747 A * 11/2000 Hunt .......................... 707/100
6,330,606 B1 12/2001 Logue et al. ................ 709/226
6,374,266 B1 * 4/2002 Shnelvar ..................... 707/204
6,418,448 B1 * 7/2002 Sarkar ..................... 707/104.1
6,453,319 B1 * 9/2002 Mattis et al. ................ 707/100
6,535,867 B1 3/2003 Waters ......................... 707/1
6,643,652 B2 * 11/2003 Helgeson et al. ............. 707/10
6,839,724 B2 * 1/2005 Manchanda et al. ......... 707/203
2002/0002569 A1 * 1/2002 Nguyen et al. .............. 707/515
2003/0093678 A1 * 5/2003 Bowe et al. ................. 713/180

OTHER PUBLICATIONS

Printed from internet Jul. 8, 2003, S. Hawke, "Identification via Secure Definition Hash: A Solution to the Semantic Web Identification Problem," http://www.w3.org/2002/09/sdh/.

* cited by examiner

*Primary Examiner*—Tim Vo
*Assistant Examiner*—Dangelino Gortayo

(57) ABSTRACT

Method and apparatus for establishing an identity for an object in an object description language. A set of attribute values describing the object may be read from a data storage arrangement. Respective numerical hash values may be calculated for each attribute value of the set of attribute values, and a unique identifier may be formed as a function of the numerical hash values. A reference to the object may be created as a function of the unique identifier, and the reference used to establish an identity of the object in the object description language.

29 Claims, 5 Drawing Sheets

US 7,426,525 B2

METHOD AND APPARATUS FOR IDENTIFYING AN OBJECT USING AN OBJECT DESCRIPTION LANGUAGE

FIELD OF THE INVENTION

The present disclosure relates in general to object description languages, and in particular to object identifiers in an object description language.

BACKGROUND

Object description languages are generally used to describe objects using a formalized set of rules and syntax. The objects described by the language may be tangible (e.g. people, things) or more abstract (e.g. Web sites, data). The language itself is typically designed to be read by a machine, and therefore, typically formatted in a computer readable form such as ASCII text.

Various object description languages known in the art, include Trivial Object Description Language (TODL), Extensible Markup Language (XML), Resource Description Framework (RDF), Knowledge Interchange Format (KIF), etc. Automated systems may use these languages to store and exploit knowledge. In particular, these languages can exploit knowledge represented as distributed data accessible on the Internet.

Object description languages are used for communicating information using simple descriptive statements. The languages may be used to serialize program data structures, database contents, or any other basic information. In general, the languages use identifiers such as a text descriptor or uniform resource identifier (URI) to reference any given object. In an RDF statement, for example, a specific URI known as the "subject" is used to provide a reference to the object. In one sense, the RDF subject may be considered the name or identifier of the object, at least for purposes of accessing its attributes in RDF.

In a knowledge database such as an RDF data store, the identifier for an object may be assigned when the RDF statements describing the objects are created, and remains constant throughout the lifetime of the object. Sometimes the identifier is a particular URI/URL specified by the user. At other times, as in the case of a blank node identifier (or bNode), the identifier is computer-generated. In either case, the identifier does not change as new statements regarding the object are added. This is efficient for storage/manipulation, and is desirable for cases where the most recent version of an object is desired.

However, in some cases, the use of typical identifiers may be problematic. For example, if a computer program is repeatedly accessing distributed data that describes an object, it is important to know when the data might have changed. If the underlying structure and/or content of the object description has been altered, then programs that access that data may produce errors or fail. Similarly, in situations when some of the distributed data is mirrored or cached, there may be no way to tell if the original data has changed (and thus the cache is out of date) without additional information.

SUMMARY

Methods and apparatus are disclosed for establishing an identity for an object in an object description language. In one embodiment, a set of attribute values describing the object may be read from a data storage arrangement. Respective numerical hash values may be calculated for each attribute value of the set of attribute values and a unique identifier formed as a function of the numerical hash values. A reference to the object may be created as a function of the unique identifier, and the reference used to establish an identity of the object in the object description language.

DETAILED DESCRIPTION

Figure 1:
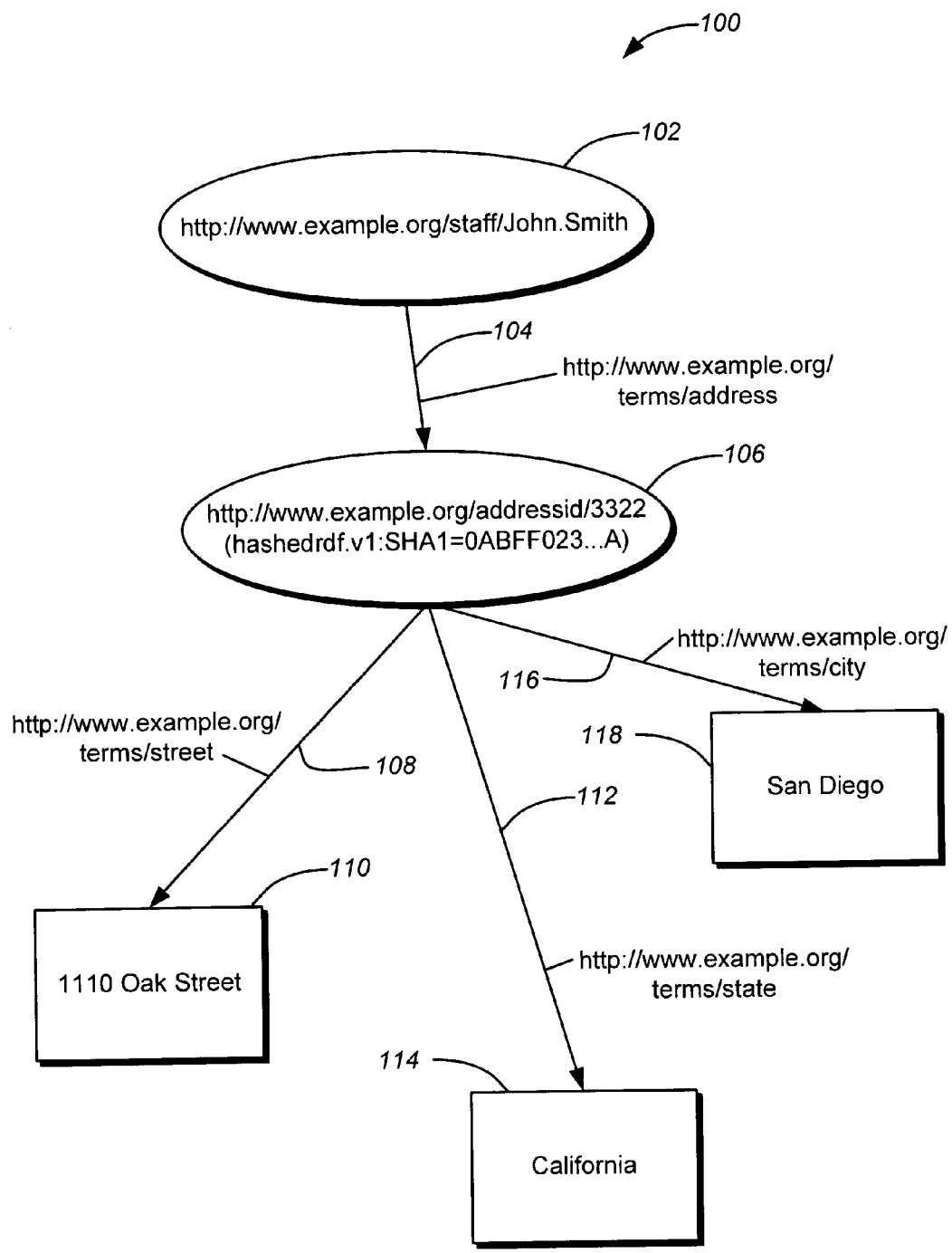
FIG. 1 is a graph of a set of RDF statements according to various embodiments of the present invention.

In the following description of various embodiments, reference is made to the accompanying drawings which form a part hereof, and in which is shown by way of illustration various example manners in which the invention may be practiced. It is to be understood that other embodiments may be utilized, as structural and operational changes may be made without departing from the scope of the present invention.

In general, the present disclosure relates to a method and apparatus for referencing objects using an identifier in an object description language such as the Resource Description Framework (RDF). The identifier is unique and may be represented as a value derived from a numerical procedure performed on a set of facts or statements that represent the object.

The following description uses examples of the RDF language on the World Wide Web for purposes of illustration. Therefore, it will be appreciated by those skilled in the art that the concepts described may be applied to other object description languages, as well as other distributed data access and networking technologies.

RDF is a language for representing information about resources. RDF is useful in describing information that is distributed over a network infrastructure such as the Internet. RDF is often utilized for representing metadata about Web resources. Web resources may include data such as the title, author, and modification date of a Web page, copyright and licensing information about a Web document, or the availability of some shared Web resource.

In addition, by generalizing the concept of a "Web resource", RDF may also be used to represent information about objects that may be identified on the Web, even when objects themselves can't be directly retrieved on the Web. RDF provides a common framework for expressing object descriptions so they may be exchanged between applications without loss of meaning.

RDF is intended to provide a simple way to make statements about Web resources. These statements are formed using Uniform Resource Identifiers (URI'S). A URI is a general purpose string that is used to identify a resource. In an RDF database, different persons or organizations may independently create URIs, and use them to identify things. However, URIs are not limited to identifying things that have network locations, or use other computer access mechanisms.

A URI may be used to refer to nearly anything. Often, URIs describe references to network-accessible objects, such as an electronic documents, images, services, or groups of other resources. URIs may also be used to represent objects that are not network-accessible, such as human beings, corporations, and bound books in a library. In other situations, URIs may be used to represent abstract concepts that don't physically exist, like the concept of a "creator".

Besides using URI's to describe objects, RDF also uses "literals", which are constant values represented by a text string. RDF statements are presented in the form (subject, predicate, object) to make a single descriptive statement about an object. A collection of interrelated RDF statements may provide a thorough and machine readable description of objects or things.

One way of expressing RDF statements involves using a form known as N-triples syntax. A prototype of the N-triples format is shown in Table 1.

TABLE 1

<subject>
<predicate>
<object>

An example RDF statement in N-triples format is shown in Table 2. The RDF subject and predicate are represented by a URI, and the RDF object may be a URI or a literal. The subject identifies the thing the statement is about. In the example of Table 2, the subject URI indicates the RDF statement may be describing the Web page referenced by the URI.

TABLE 2

<http://www.example.org/index.html>
<http://www.example.org/terms/creation-date>
"27 June 2003."

The predicate of an RDF statement identifies a property or characteristic of the statement's subject. Using the example in Table 2, the predicate indicates that the RDS statement describes the creation date of the Web page. The object identifies the value of the predicate, which in this example is the literal "27 Jun. 2003."

The triplet of {subject, predicate, object} in an RDF statement may be represented as a graph. The subject and object are represented as nodes and the predicate is shown as an arc connecting the subject and object nodes. Therefore, relationships that may be represented as a graph may be broken down into a group of RDF statements by representing each node-arc-node part of the graph as an RDF statement.

It will be appreciated that the use of the term "object" to both describe part of the RDF syntax and a thing described by RDF statements may be a source of confusion. As used herein, the term "object-identifier" will be used to refer to the "object" part of an RDF statement. The general use of the word "object" as used hereinbelow refers to a thing described by an RDF statement. The RDF subject (or "subject-identifier") provides a name or label for that thing, and a collection of RDF statements having the same subject-identifier all refer to the same thing/object.

Turning now to FIG. 1, a graph 100 illustrates an example of an RDF description according to various embodiments of the invention. In this example, the graph 100 has a root node 102 containing a subject-identifier URI that refers to a person.

The arc 104 represents a predicate that describes an address of the person. The node 106 has an object-identifier URI that represents the value of the person's address. In this example, the address has three parts, represented by the three literals shown in nodes 110, 114, and 118. As is evident from the predicate values shown on the arcs 108, 112, 116, the nodes 110, 114, and 118 represent a street address, a city, and a state, respectively, of the address.

The graph 100 in FIG. 1 illustrates that nodes may act as both subject-identifiers and object-identifiers in RDF. For example, node 106 is the object-identifier of the person object represented by 102, and node 106 is also the subject-identifier of the address object.

The example URI of node 106 uses the identification number "3322" that may be assigned by a person or a database. This identification number may or may not have significance to the user of the data. Sometimes an RDF description will forgo an explicit identifier URI and use what is known as a blank node identifier (or bNode). A bNode serves as a replacement for a URI in cases where a URI is either unspecified or unknown.

For example, the URI "http://www.example.org/addressid/3322" represents an aggregate of address data such as the city, state, etc. Therefore the aggregate may never need to be directly referenced, but the individual elements of the aggregate are directly referenced. In such a case, the aggregate may be represented by a bNode. In a graphical format such as FIG. 1, this would be represented by leaving the node 106 blank.

Of course, when the RDF is written or stored as statements, then subjects and objects cannot simply be left blank and so internally-generated identifiers are used. For example, when statements are written using the N-triples syntax, each bNodes is written as "_:name" where "name" is an internally generated name for the node. So, in FIG. 1, an example bNode identifier used for node 106 would be "_:johnaddress."

For purposes of this example, however, it is assumed that the resource identified in node 106 needs to be externally accessed. If the illustrated URI "http://www.example.org/addressid/3322" is used to access the address object, then an external user of the URI may need to repeatedly access the underlying data over time. In other situations, the external user may desire to cache the entire address object for quicker access.

The URI generated for node 106 may include some number generated by a database entry or a person when the object was created. In other RDF statements, the URI describing the object may just be a name, such as "http://www.example.org/staff/John.Smith#address." In either case, the URI may give a general description of the underlying data that remains constant regardless of the state of the underlying data.

In many cases, it may be preferable that the identifier provide a unique representation that depends on the underlying facts or attribute values that describe an object. As shown in the example of FIG. 1, this may be done by replacing the assigned URI of node 106 with a hashed URI (indicated in parenthesis in node 106). The hashed URI may be written in any format, although in this example the format is hashedrdf.<version>:<hashing_algorithm>=<hash_value>. So in the example of FIG. 1, node 106 uses a hashed URI with an SHA-1 hashing algorithm.

The hash value may be any numerical, binary, or string representation that is usable with the target object description language and may uniquely identify a set of attribute values that describe the object. In the example of FIG. 1, the attribute values that describe the address object defined by node 106 include the predicates 108, 112, and 116 as well as literal object-identifiers 110, 114, and 118. In general, the attribute values that describe the object are collected, arranged into a buffer, and a hashing algorithm performed on that buffer. It may be desirable for the hashing algorithm to return a different identifier for any two non-identical buffers. The resulting hash value is used to form a URI to uniquely identify that object.

When using a replacement hashed URI as shown in FIG. 1, the old URI may be simply replaced. However, when doing this, the old URI may no longer be referenced. Since the subject-identifier URI may have useful information, it may be useful to include the old URI in the RDF statements. One way of preserving the old subject-identifier URI is illustrated in FIG. 2.

Figure 2:
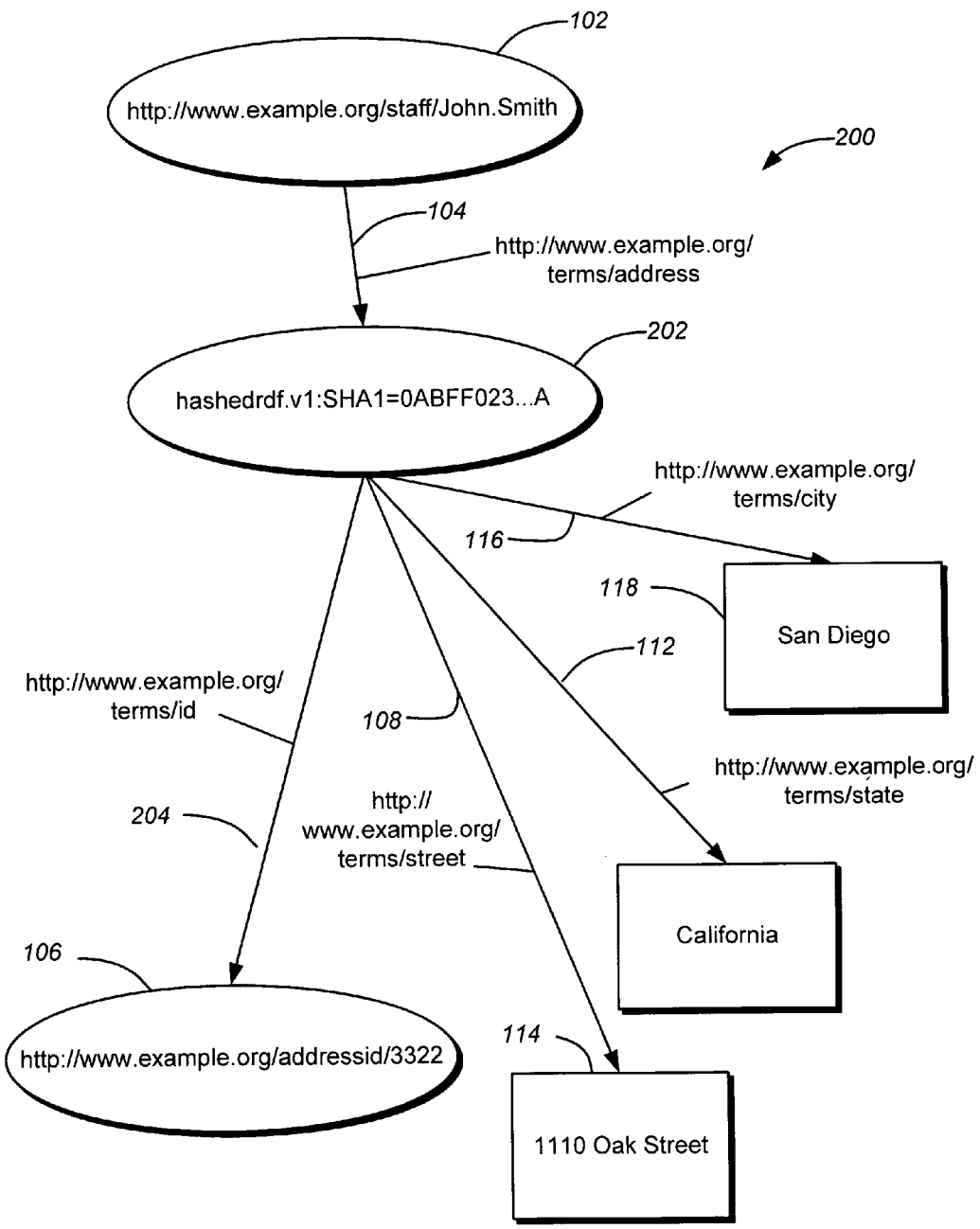
FIG. 2 is an alternate arrangement of a graph of RDF statements according to various embodiments of the present invention.

In FIG. 2, a new graph 200 is formed from the graph 100 of FIG. 1. Instead of renaming the node 106 from FIG. 1, a new node 202 replaces the node 106. The new node 202 contains the hashed URI of the address object. The old subject-identifier URI of node 106 is included as the object-identifier of a new statement with a new predicate indicated by the arc 204. Adding such a new statement when using the hashed URI preserves whatever resource the old subject-identifier was referencing.

Adding a new RDF statement with the replacement hashed URI may enforce consistency and clarify the meaning of the original subject-identifier URI. In the example of FIG. 2, the predicate arc 204 indicates that the URI in node 106 is an identification number. Although the URI in node 106 is fairly self explanatory, this is not always the case. For example, if an RDF subject-identifier is "http://www.example.com/index.html", this could be a reference to the company or to the company's Web site. By replacing this subject-identifier with a hashed URI and adding a new statement with the predicate "http://www.example.org/terms/homePage", it can be made clear that the subject-identifier refers to the Web site.

A unique hashed URI may help provide consistency in context between transactions. For example, if agent A is negotiating a transaction with agent B, various facts regarding the subject of the transaction will be exchanged over time. These exchanges create assumptions about the state of the facts as they were provided during the transaction, even though it is possible by the close of the transaction some of the facts have changed. The hashed URI provides a way of verifying older facts with the facts at the close of the transaction, thereby ensuring that nothing has changed in the interim.

Figure 3:
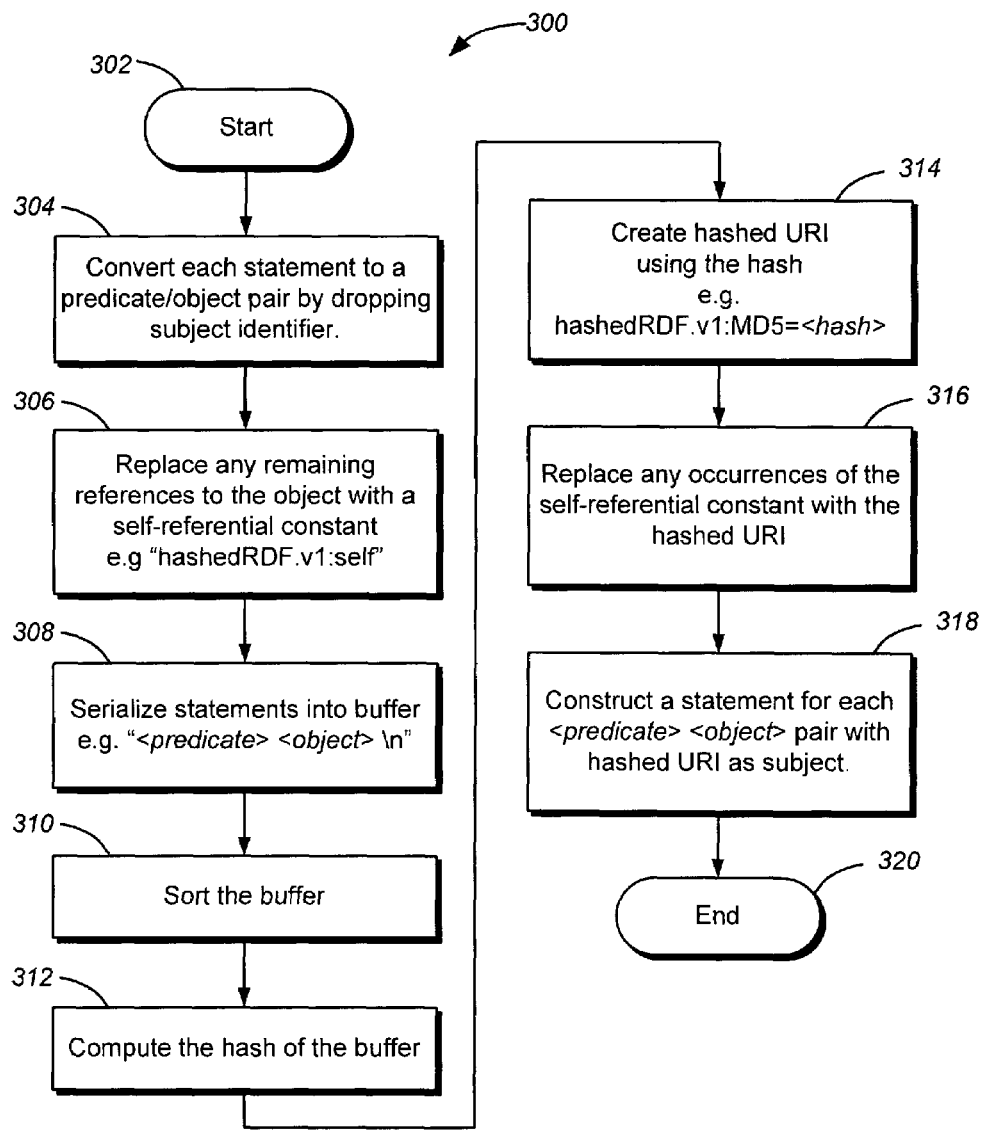
FIG. 3 is a flowchart of a procedure for calculating a unique identifier for an object according to various embodiments of the present invention.

Various techniques may be used to create a hashed URI from the attribute values of an RDF object. FIG. 3 shows one example routine 300 for creating a hashed URI according to various embodiments of the present invention. At the start (302) of the routine, it is assumed that the data set includes one or more RDF statements all having a common subject-identifier.

It is not required that the entire set of RDF statements pertaining to the object be used in the procedure 300. For example, non-machine interpretable statements such as comments would likely be discarded. In another example, it may be desirable to only hash over a subset of the RDS statements that describe the object. This is because some statements may be assumed to be relatively invariant, while others likely to change. For example, if a set of RDS statements describe an electronics product for sale, certain attribute values such as model number, height, and weight are unlikely to change. However, other descriptions such as price and availability are subject to change over time. Therefore, in some cases the object could be broken into two parts, with the static part being referenced by a hashed URI and the dynamic part being referenced by a conventional URI.

Once the set of RDF statements has been identified, all of the statements may be converted (304) to predicate/object identifier pairs by dropping the subject-identifier. The remaining predicate/object identifier pairs are a minimal set of attribute values that may be used to describe the object. During conversion (304), it may also be desirable to check any of the predicate/object pairs for bNodes. Because bNodes are temporary, locally assigned variables, they may cause problems in creating a reproducible hash value in a distributed arrangement. One approach is to replace local bNode identifiers with identifiers which are known to be globally unique. In cases where it is possible, it may be desirable to replace each bNode by a hashed identifier, applying the algorithm recursively.

Besides checking for bNodes, the procedure also should be arranged to check for cyclic references between objects with hashed URIs. A cyclic reference is, for example, where object A has a statement that refers to object B and object B has a statement that refers to object A. If cyclic references are present, a surrogate URI may be used to represent at least one object. The hashed URIs may then be computed. Finally, additional attribute values are added to the RDF model to state that the surrogate URI is equivalent to the hashed URI.

It will be appreciated that RDF allows self-referential statements. In terms of RDF syntax, this means that a particular URI may be used both as a subject-identifier and an object-identifier in the same statement, or the subject-identifier may be used as an object-identifier in other RDF statements of the object. In a graph representation, this means that an arc may loop back to a node, either directly or indirectly through other nodes. Therefore, when replacing this URI in the subject-identifier, the URI must also be replaced (306) wherever the URI occurs in the predicate/object identifier pairs. Since the resultant hashed value is not yet known, a predetermined, constant value may used as a replacement during this stage of the procedure. In this example, the URI "hashedRDF.v1:self" is used to replace the self referential URIs.

Next, the predicate/object identifier pairs may be serialized (308) into a buffer in a predetermined arrangement. In this example, the pairs are serialized (308) by creating a line of text including the predicate-identifier followed by a space, the object-identifier, and a new-line character.

An RDF model does not require any predetermined ordering of statements that describe an object. Therefore the buffer containing the serialized predicate/object identifier pairs may require sorting (310) using a standard sorting algorithm. This allows the hashing algorithm to return repeatable results regardless of the order in which the RDF statements are entered into the model. After the sorting operation (310), the buffer contains the sorted predicate/object identifiers, and the hash value may now be computed (312). Any hashing algorithm may be used, such as MD-5 or SHA-1 algorithms.

Once the hash value is obtained, a URI is created (314) using the hash value. In this example, the hashed URI includes "hashedRDF.v1:MD5=<hash_value>", indicating an MD-5 hashing algorithm was used. If any self-references were used in the RDF model, the self-referential constants may now be replaced (316) with the hashed URI. Finally, a statement may be constructed (318) for each predicate/object-identifier pair and added to the model. The routine exits (320) with the new RDF model identified with the hashed algorithm.

It will be appreciated that the procedure 300 may be performed during creation of an RDF object model and may be reproduced by any users of the data. This allows the user to verify the integrity of a distributed object described in RDF. In distributed systems, this allows the users to rely on untrusted storage for RDF data stores. Similarly, for mirrored or cached data, it becomes very easy to tell if any underlying descriptive attribute values have been changed, since any changes to the value or structure of the attribute values will be indicated by a different hashed URI.

When using the procedure 300, the full set of fact data (or a pre-determined subset) is used when creating the hashed URI. For every change to the object, the entire set of attribute values may be used when recalculating the hash value, and the order of the attribute values is important. However, in an alternate approach, the hashed URI may be created using a set hash of the RDF statements. A set hash may be formed by performing a function on (typically adding) a hash value of each added statement and an existing hash value. Similarly, removing statements may involve using an inverse function (e.g. subtraction) on the hash value of removed statements and the existing hash value.

The set hash is independent of the order in which the items are entered into the hash. Therefore, performing expensive sorting operations on the set of RDF facts before calculating the hash value is not required. Using a set hash is also efficient when updating the object because access to all RDF fact statements of the object is not required to add or remove statements. Only the current hashed URI and a hash value of an added or deleted statement may be required to perform the update.

Figure 4:
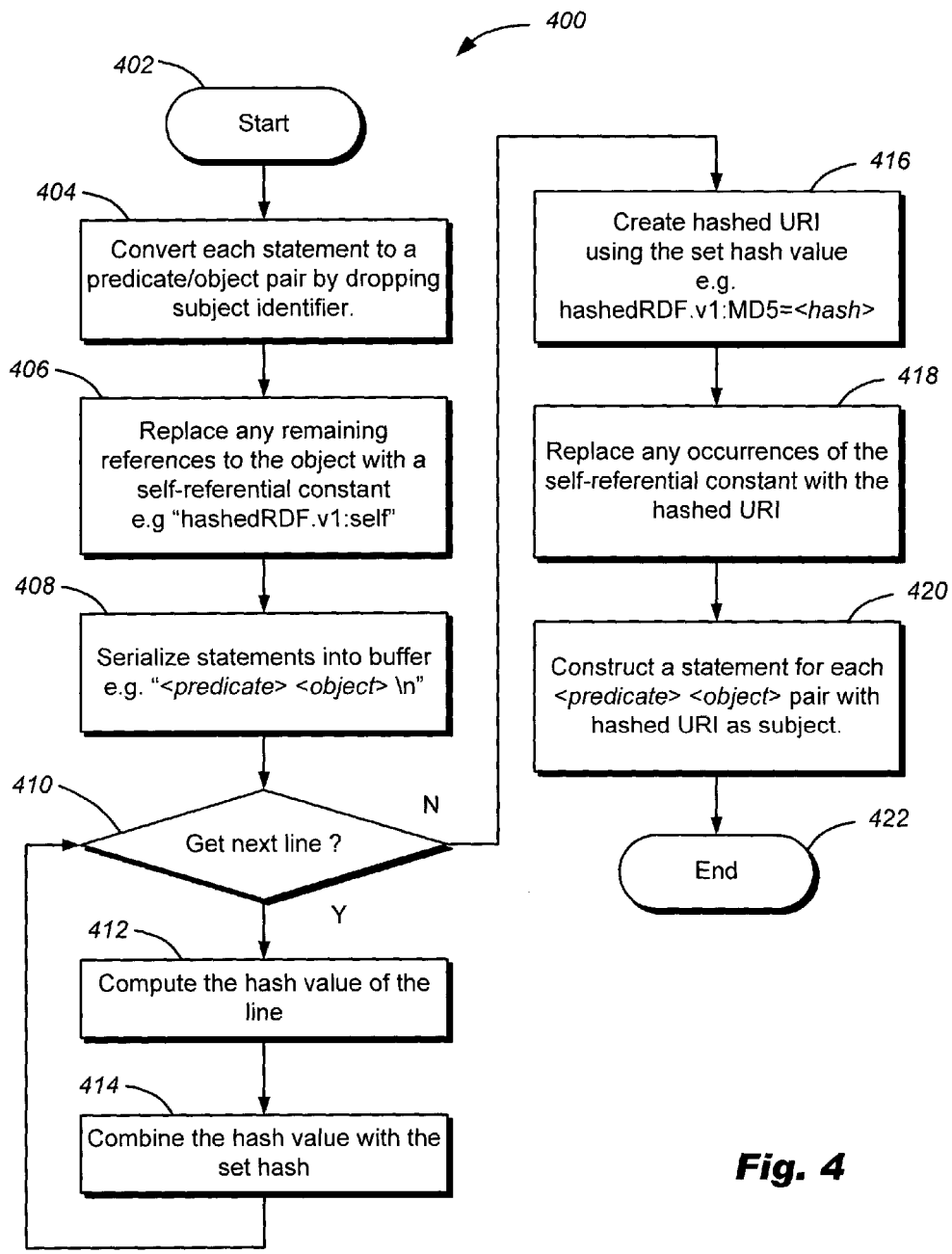
FIG. 4 is a flowchart of another procedure for calculating a unique identifier for an object according to various embodiments of the present invention.

An example of creating a hashed URI from a set hash is shown in the procedure 400 of FIG. 4. Similar to FIG. 3, the procedure begins (402) with a set of one or more RDF statements all having a common subject-identifier. The statements may be converted (404) to predicate/object pairs, self-referential statements may be replaced (406) with a constant, and the statements may be serialized (408) into a buffer.

In this procedure 400, once the buffer is serialized (408), the buffer may be checked (410) for the existence of a line. If a line is available (i.e. the buffer is not yet empty) a line may be removed (410) from the buffer. The hash value of the line may be computed (412) and the hash value combined with the set hash (414). This combination (414) of the computed hash value with the set hash typically involves addition, although other mathematical or logical functions may be used. Prior to combining values (414) with the set hash, the set hash may be initialized to zero. Alternatively, the initial value of the set hash may be set to some other value. For example, the set hash may be initialized to a private key of a verification authority so that the statements can't be forged.

Once all of the lines have been extracted (410) from the buffer, the hashed URI may be created (416), any self-referential constants may be replaced (418), new RDF statements may be constructed (420), and the procedure exits (422). It will be appreciated that this procedure 400 may also be used for adding new statements to the object if the set hash is initialized to the last calculated hash value of the object. The input to the procedure 400 in such a case may be a list of the newly added statements. Similarly, the procedure 400 may be used to delete statements from the object by subtracting the hash of each line from the set hash instead of adding (414). The input to the procedure in that case may be a list of statements to be removed.

Figure 5:
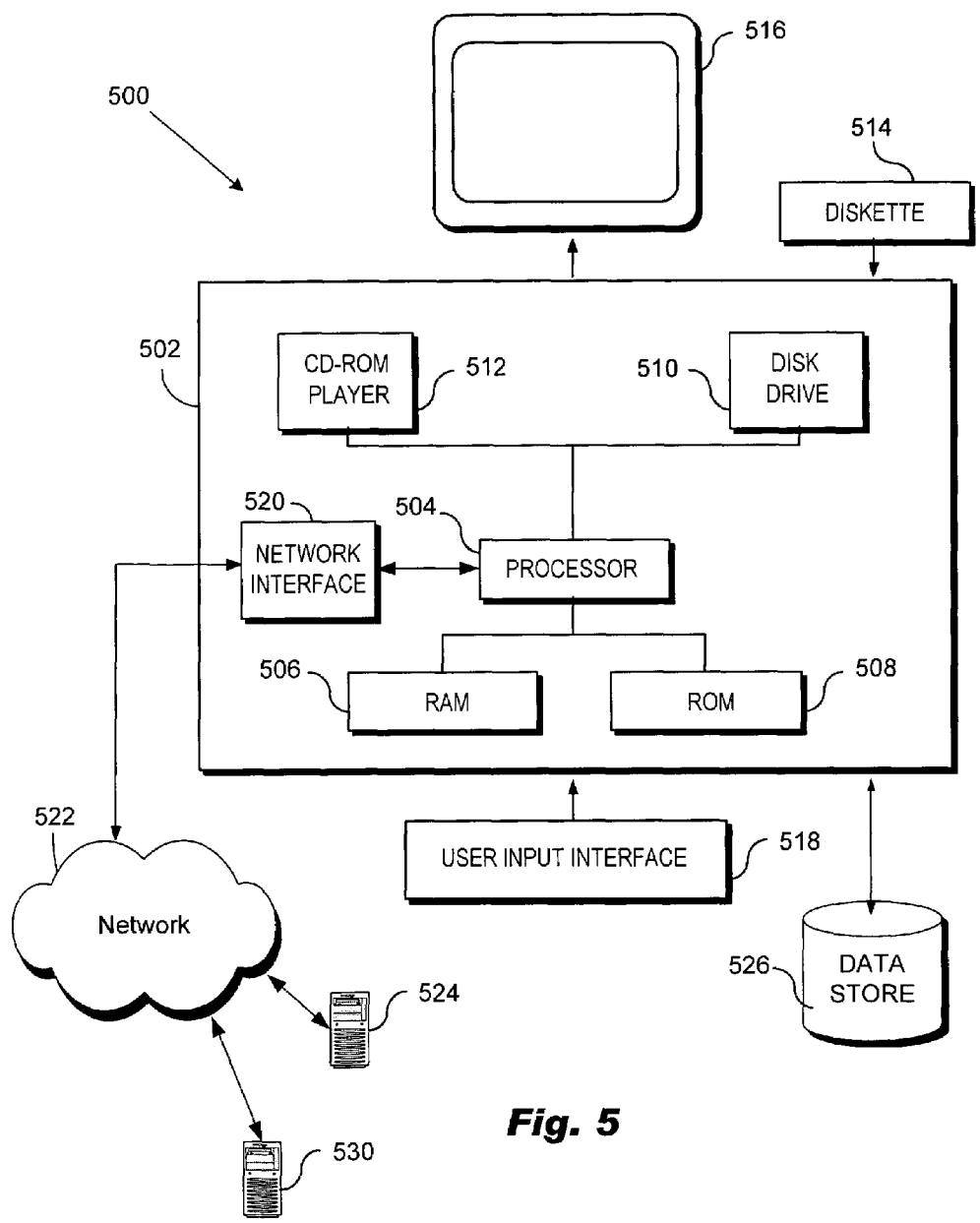
FIG. 5 is a system diagram of a data processing arrangement for providing a unique identifier according to various embodiments of the present invention.

In reference now to FIG. 5, a system 500 is shown in which an RDF data arrangement according to embodiments of the present invention may be employed. The system includes a computing apparatus 502 with a processor 504 and coupled to some form of data storage. The data storage may include volatile memory such as RAM 506. Other devices that the apparatus 502 may use for data storage and retrieval include a ROM 508, disk drive 510, CD-ROM 512, and diskette 514.

A display 516 and user-input interface 518 are attached to the computing apparatus 502 to allow data input and display. The computing apparatus 502 includes a network interface 520 that allows the apparatus to communicate with other computing devices 524, 530 across a network 522.

One or more RDF data stores 526 may be used to hold RDF attribute values and hashed URIs generated from those attribute values. The RDF data store 526 may be distributed across various storage devices such as the disk drive 510, as well as other computers on the network 522. The procedures for creating the hashed URIs for the RDF data store 526 may run on any combination of hardware and software.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-implemented method for identifying an object using an object description language, comprising:
    reading a set of attribute values from a data storage arrangement, the set of attribute values describing an object according to an object description language;
    wherein the attribute values are specified as one or more text strings in a plurality of statements in the object description language and each attribute value is associated with a subject part and a predicate part of a respective statement in the object description language, and the subject-parts of the plurality of statements are equal;
    calculating respective numerical hash values for each attribute value of the set of attribute values;
    forming a unique identifier as a function of the numerical hash values;
    creating a reference to the object as a function of the unique identifier;
    establishing an identity of the object in the object description language using the reference to the object; and
    wherein establishing the identity includes replacing the subject part in each of the plurality of statements with the unique identifier.

2. The method of claim 1, wherein the function of the numerical hash values comprises a sum of the numerical hash values.

3. The method of claim 1, wherein the object description language comprises the Resource Description Framework (RDF).

4. The method of claim 3, wherein the set of attribute values comprises one or more RDF predicate/object identifier pairs.

5. The method of claim 1, wherein calculating the numerical hash values comprises using an SHA-1 hashing technique.

6. The method of claim 1, wherein calculating the numerical hash values comprises using an MD5 hashing technique.

7. The method of claim 1, wherein the reference to the object comprises a Universal Resource Identifier (URI).

8. The method of claim 1, further comprising: adding a new attribute value describing the object to the set of attribute values; forming a new unique identifier as a function of the unique identifier and a numerical hash value of the new attribute value; and updating the reference to the object with the new unique identifier.

9. The method of claim 8, wherein the function of the unique identifier and the numerical hash value of the new attribute value comprises a sum of the unique identifier and the numerical hash value of the new attribute value.

10. The method of claim 1, further comprising: removing an attribute value of the set of attribute values; forming a new unique identifier as a function of the unique identifier and a numerical hash value of the removed attribute value; and updating the reference to the object with the new unique identifier.

11. The method of claim 10, wherein the function of the unique identifier and the numerical hash value of the removed attribute value comprises a difference of the unique identifier and the numerical hash value of the removed attribute value.

12. A computer-readable medium configured with instructions for causing a computing device to perform steps for identifying an object using an object description language, the steps comprising:
reading a set of attribute values from a data storage arrangement, the set of attribute values describing an object according to an object description language;
wherein the attribute values are specified as one or more text strings in a plurality of statements in the object description language and each attribute value is associated with a subject part and a predicate part of a respective statement in the object description language, and the subject-parts of the plurality of statements are equal;
calculating respective numerical hash values for each attribute value of the set of attribute values;
forming a unique identifier as a function of the numerical hash values;
creating a reference to the object as a function of the unique identifier;
establishing an identity of the object in the object description language using the reference to the object; and
wherein establishing the identity includes replacing the subject part in each of the plurality of statements with the unique identifier.

13. The computer-readable medium of claim 12, wherein the function of the numerical hash values comprises a sum of the numerical hash values.

14. The computer-readable medium of claim 12, wherein the object description language comprises the Resource Description Framework (RDF).

15. The computer-readable medium of claim 14, wherein the set of attribute values comprises one or more RDF predicate/object identifier pairs.

16. The computer-readable medium of claim 12, wherein calculating the numerical hash values comprises using an SHA-1 hashing technique.

17. The computer-readable medium of claim 12, wherein calculating the numerical hash values comprises using an MD5 hashing technique.

18. The computer-readable medium of claim 12, wherein the reference to the object comprises a Universal Resource Identifier (URI).

19. The computer-readable medium of claim 12, wherein the steps further comprise: adding a new attribute value describing the object to the set of attribute values; forming a new unique identifier as a function of the unique identifier and a numerical hash value of the new attribute value; and updating the reference to the object with the new unique identifier.

20. The computer-readable medium of claim 19, wherein the function of the unique identifier and the numerical hash value of the new attribute value comprises a sum of the unique identifier and the numerical hash value of the new attribute value.

21. The computer-readable medium of claim 12, wherein the steps further comprise: removing an attribute value of the set of attribute values; forming a new unique identifier as a function of the unique identifier and a numerical hash value of the removed attribute value; and updating the reference to the object with the new unique identifier.

22. The computer-readable medium of claim 21, wherein the function of the unique identifier and the numerical hash value of the removed attribute value comprises a difference of the unique identifier and the numerical hash value of the removed attribute value.

23. An apparatus for identifying an object using an object description language, comprising:
a data storage; and
a processor coupled to the data storage and arranged to
read a set of attribute values that describe an object from the data storage;
wherein the attribute values are specified as one or more text strings in a plurality of statements in the object description language and each attribute value is associated with a subject part and a predicate part of a respective statement in the object description language, and the subject-parts of the plurality of statements are equal;
calculate respective numerical hash values for each attribute value of the set of attribute values;
form a unique identifier as a function of the numerical hash values;
create a reference to the object using the unique identifier;
establish an identity of the object in the object description language using the reference to the object; and
wherein the processor is configured to replace the subject part in each of the plurality of statements with the unique identifier in the establishment of the identity.

24. The apparatus of claim 23, wherein the function of the numerical hash values comprises a sum of the numerical hash values.

25. The apparatus of claim 23, wherein the object description language comprises the Resource Description Framework (RDF).

26. The apparatus of claim 25, wherein the set of attribute values comprises one or more RDF predicate/object identifier pairs.

27. The apparatus of claim 23, wherein the reference to the object comprises a Universal Resource Identifier (URI).

28. The apparatus of claim 23, wherein the processor is arranged to calculate the numerical hash values using an SHA-1 hashing technique.

29. The apparatus of claim 23, wherein the processor is arranged to calculate the numerical hash values using an MD5 hashing technique.

* * * * *